UNITED STATES PATENT OFFICE.

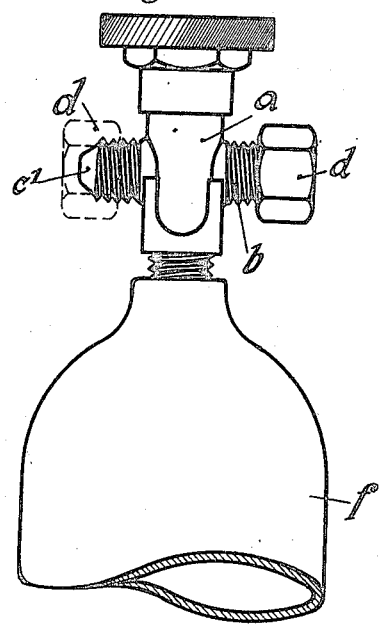
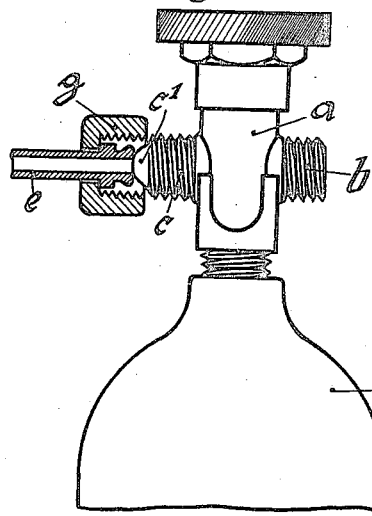

ALEXANDER BERNHARD DRÄGER, OF LUBECK, GERMANY.

STOP VALVE FOR PRESSURE-GAS CONTAINERS.

1,424,810.  Specification of Letters Patent.  Patented Aug. 8, 1922.

Application filed June 9, 1921. Serial No. 476,233.

*To all whom it may concern:*

Be it known that I, ALEXANDER BERNHARD DRÄGER, a citizen of Germany, residing at Lubeck, Germany, have invented certain new and useful Improvements in Stop Valves for Pressure-Gas Containers (for which I have filed applications in Germany July 14, 1916, Austria April 28, 1917, and Hungary May 3, 1917), of which the following is a specification.

The customary stop valves for containers, steel-cylinders and the like for keeping and transporting high pressure gases for example such as high pressure oxygen, are provided with a lateral threaded socket to which is connected the delivery pipe by means of a cap nut. In order to protect the external thread of the said delivery socket during the keeping or transporting against damage or being stopped up with dirt, it is usual to screw on to the said socket a suitable screw cap which is taken off when the delivery pipe is to be connected to the said socket. For safely keeping the detached screw cap from being lost or laid astray it is screwed on a dead socket provided in accordance with the present invention for this purpose on the stop valve casing preferably opposite the delivery socket. This dead socket consists of an externally threaded solid stud or bolt firmly attached to or made in one piece with the valve casing. The screw cap remains on the dead or blind socket until it shall serve again its proper purpose.

By mistake, particularly in the dark, it may happen that the delivery pipe, when the screw cap has not been screwed on the dead socket, can be screwed to the latter in which case oxygen will be wasted when the stop valve is opened. In order to avoid such wasting of high pressure gas the free end face of the dead socket is provided, according to a further feature of the invention, with a dome-shaped head which must project so much beyond the end face that when the delivery pipe is applied to the dead socket, the cap nut does not reach the thread of the dead socket and can not be screwed on the latter whereby the person attending the oxygen cylinder will soon become aware of this having tried to apply the delivery pipe to the wrong socket.

The accompanying drawing illustrates a stop valve constructed in accordance with and embodying the present invention.

Figure 1 is an elevation of the stop valve of an oxygen cylinder; the cap nut being screwed home on the delivery socket; and Figure 2 a like elevation, but the cap nut screwed off and the delivery pipe set wrongly against the dead socket.

Similar letters of reference refer to similar parts throughout the several views.

The casing $a$ of the stop valve of any well known construction for the oxygen cylinder $f$ is provided preferably opposite the threaded delivery socket $b$ a threaded dead or blind socket $c$ that is to say, a solid stud or projection with a projecting dome $c^1$ or the like on its free end face.

When oxygen is to be taken from the cylinder $f$, the protecting screw cap $d$ is screwed off from the delivery socket $b$ and screwed on to the dead socket $c$ as indicated by dotted lines in Figure 1. The screw cap can then not get lost and is always at hand, when after finishing the use of the cylinder, shutting off the stop valve and taking off the delivery pipe from the socket $b$, this latter is to be closed and protected again by the said screw cap.

When for any reason the screw cap $d$ screwed off from the socket $b$ is not screwed on the dead socket $c$ and the delivery pipe $e$ (Fig. 2) with its cap nut $g$ is put inadvertently for example in the dark, against the dead socket $c$, the dome $c^1$ keeps the delivery pipe $e$ sufficiently away so that the cap nut $g$ can not reach the thread of the dead socket $c$. By this it will be recognized at once that for connecting the delivery pipe $e$ the other socket $b$ is the right one and must be taken.

I claim:

1. In a stop valve for pressure gas containers the combination of a threaded delivery socket, a threaded dead socket, and a protecting screw cap adapted to be screwed on one or the other.

2. In a stop valve for pressure gas containers the combination of a threaded delivery socket, a threaded dead socket having a domeshaped projection on its free end face, and a protecting screw cap adapted to be screwed on one or the other socket.

ALEXANDER BERNHARD DRÄGER.